United States Patent [19]

Nakamura

[11] Patent Number: 4,639,283
[45] Date of Patent: Jan. 27, 1987

[54] METHOD FOR MAKING A DIAPHRAGM FOR AN ELECTRO-ACOUSTIC TRANSDUCER

[75] Inventor: Akira Nakamura, Iwata, Japan

[73] Assignee: Nippon Gakki Seizo Kabushiki Kaisha, Hamamatsu, Japan

[21] Appl. No.: 676,280

[22] Filed: Nov. 29, 1984

[30] Foreign Application Priority Data

Dec. 2, 1983 [JP] Japan .................................. 58-227890
Dec. 2, 1983 [JP] Japan .................................. 58-186695

[51] Int. Cl.$^4$ ...................... B32B 19/06; C04B 38/06; B28B 1/26; B28B 7/34
[52] U.S. Cl. ..................................... 156/89; 181/167; 264/44; 264/129; 264/136; 264/137; 264/317; 264/DIG. 44
[58] Field of Search ................ 264/44, 317, 129, 136, 264/137, DIG. 44

[56] References Cited

U.S. PATENT DOCUMENTS

| | | | |
|---|---|---|---|
| 3,112,184 | 11/1963 | Hollenbach | 264/317 X |
| 3,574,646 | 4/1971 | Wismer et al. | 264/44 X |
| 3,616,841 | 11/1971 | Walz | 264/44 X |
| 3,939,002 | 2/1976 | Washbourne | 264/44 X |
| 4,332,753 | 6/1982 | Crooke | 264/44 |

FOREIGN PATENT DOCUMENTS 56-69995 6/1981 Japan .

Primary Examiner—Philip Anderson
Attorney, Agent, or Firm—Cushman, Darby & Cushman

[57] ABSTRACT

A diaphragm for loudspeakers and the like comprises a diaphragm base component formed of ceramics of a three-dimensional network structure so as to be light in weight, high in bending stiffness, easy to make and high in sound velocity. The diaphragm base component is sealed by a sealing material so as to be made air-permeable. This diaphragm is made by impregnating combustible foamed plastics material with a ceramic slurry, baking the ceramic impregnated foamed plastics to burn off the foamed plastics material, and the diaphragm base component sealing with the sealing material.

8 Claims, 12 Drawing Figures

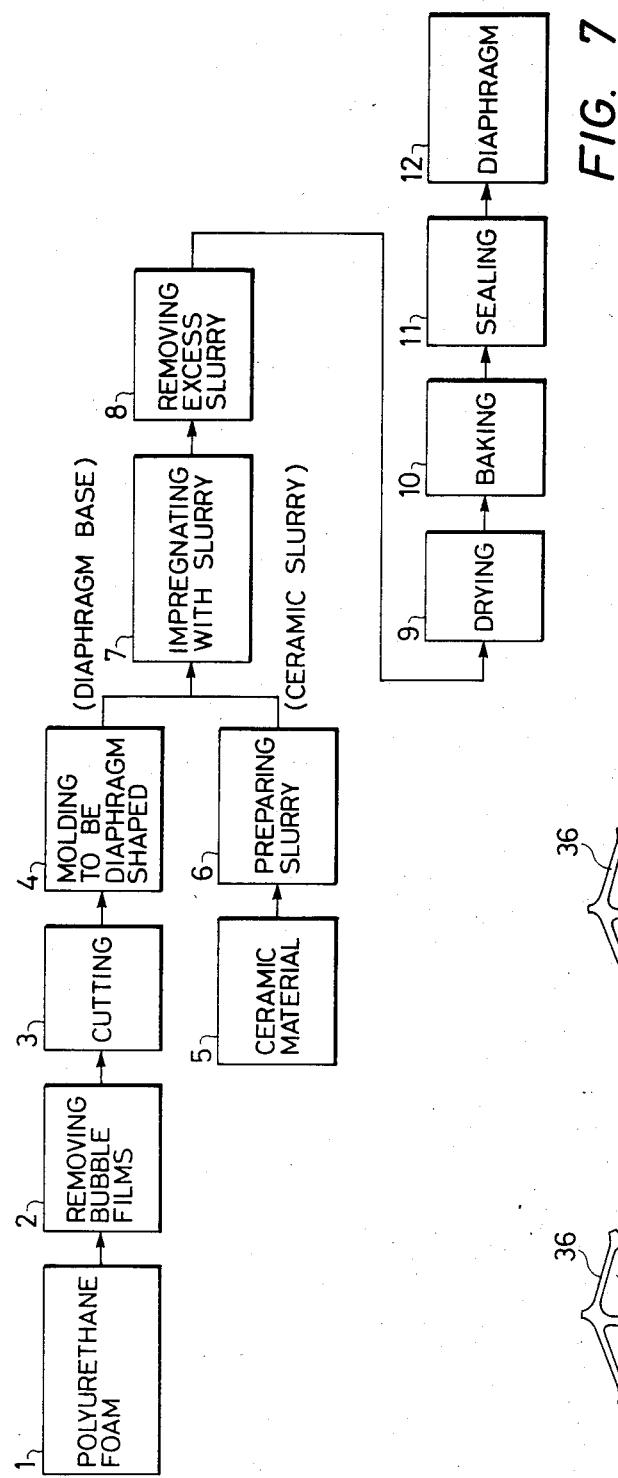
FIG. 7
FIG. 8b
FIG. 8a

4,639,283

METHOD FOR MAKING A DIAPHRAGM FOR AN ELECTRO-ACOUSTIC TRANSDUCER

BACKGROUND OF THE INVENTION (a) Field of the Invention

This invention relates to diaphragms to be used for electro-acoustic transducers such as loudspeakers and the like and a method of making the same.

(b) Description of the Prior Art

There are already known diaphragms for loudspeakers using ceramics material high in the heat stability and Young's modulus. In a conventional ceramics diaphragm, there is a problem of reducing the weight of the diaphragm. Therefore, in order to reduce the diaphragm weight, void spaces are formed in a ceramic plate to reduce the apparent specific gravity. For example, in Japanese Patent Preliminary Publication No. Sho 56-69995, a honeycomb structure made of ceramics is disclosed. However, ceramics are so brittle that it is very difficult to form a honeycomb structure of ceramics and it has been practically impossible in case the manufacturing cost is considered. Generally, as shown in FIGS. 1a to 1c, the honeycomb structure is made by piling up flat plate members 2 with a bonding agent 1 zigzagging among them (FIG. 1a), pressing the members 2 into contact with one another (FIG. 1b) and expanding them (FIG. 1c). However, in the thus-made honeycomb structure, the bending stiffness in the direction at right angles with the expanding direction will be about twice as high as the bending stiffness in the expanding direction and the bending stiffnesses in both of these directions will vary also depending on the expanding degree (fluctuation of the pulling force). Therefore, the vibration mode will not be axially symmetrical. For example, in a circular flat plate diaphragm, the node shape appearing on the diaphragm surface (the line connecting the positions in which the amplitude is zero on the diaphragm) will be elliptical and a magnetic circuit having an elliptical voice coil and elliptical magnetic gap will be required to make a node drive (driving in the node position) and will be very difficult to produce.

SUMMARY OF THE INVENTION

An object of the present invention is to provide a diaphragm for an electro-acoustic transducer, which diaphragm is light in weight and high in stiffness.

Another object of the present invention is to provide a diaphragm for an electro-acoustic transducer wherein a circular node shape can be easily obtained and a node drive can be easily performed.

A further object of the present invention is to provide a diaphragm for an electro-acoustic transducer having no anisotropy in the structure and one which is easy to make.

Yet another object of the present invention is to provide a diaphragm for an electro-acoustic transducer formed of ceramics of a three-dimentional network structure.

A further object of the present invention is to provide a method of making such diaphragms as are described above.

The diaphragm of the three-dimentional network structure according to the present invention is made by preparing a combustible foamed plastics material as a non-rigid polyurethane foam or the like in a diaphragm shape, impregnating this foamed plastics material, as a mold with a ceramic slurry and baking it to burn off the combustible foamed plastics and sealing the thus-obtained diaphragm base to be air-tight. The three-dimensional network structure has cubically overlapped skeletal members, is high in void space rate (that is, it is low in apparent specific gravity) and is high in bending stiffness. By using the making method using the above described foamed plastics material, the intended diaphragm can be easily made and the manufacturing cost can be reduced. Also, by using such method, a less anisotropic structure can be obtained, a circular node shape can be easily obtained and a node drive can be easily achieved. The three-dimentional network structure, as manufactured, is air-permeable and can not act as a diaphragm for an electro-acoustic transducer. In accordance with the principles of the present invention, it is therefore coated on the surface or impregnated in the interior with a sealing member so as to be made air-impermeable.

These and other objects of the present invention will become more apparent during the course of the following detailed description and from the appended claims.

BRIEF DESCRIPTION OF THE DRAWINGS

FIG. 7 is a view showing an example of the method of making a diaphragm of the present invention.

FIG. 8a is a perspective view showing the structure of one bubble of a non-rigid polyurethane foam before the bubble film is removed.

FIG. 8b is a perspective view showing the structure of one bubble of a non-rigid polyurethane foam after the bubble film is removed.

DESCRIPTION OF THE PREFERRED EMBODIMENTS

An embodiment of the present invention shall be explained in the following with reference to the accompanying drawings.

First of all, a diaphragm for electro-acoustic transducer with a three-dimensional network structure to which the present invention is applied shall be explained.

Figure 1A:
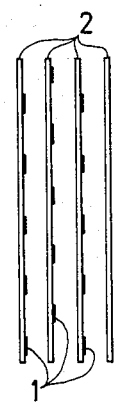
FIGS. 1a to 1c are views showing a general method of making a honeycomb structure.
Figure 1B:
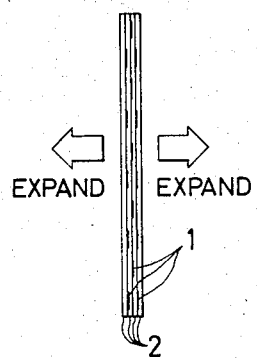
Figure 1C:
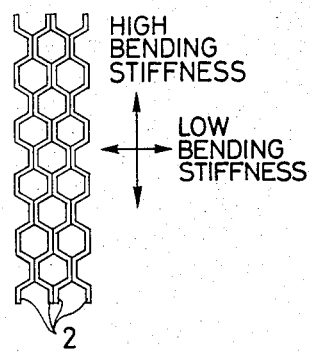
Figure 2:
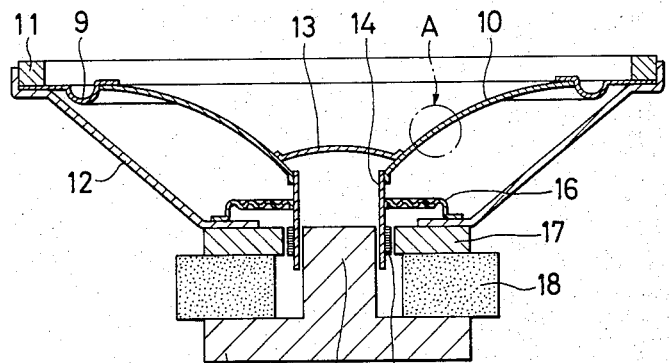
FIG. 2 is a sectional view showing a loudspeaker device having a conical diaphragm to which the present invention is applied.

In FIG. 2 showing a loudspeaker device having a cone-shaped diaphragm 10 of a three-dimensional network structure, the diaphragm 10 is fixed in the peripheral edge portion to a frame 12 through an edge 9 and is pressed by a gasket 11, a center cap 13 is fixed in the center portion of the diaphragm 10, a voice coil bobbin 14 is fixed to the back surface of the center cap 13 and a voice coil 15 is wound on the voice coil bobbin 14 which is supported by the frame 12 through a damper 16.

The frame 12 is fixed with a top yoke plate 17, ferrite magnet 18 and bottom yoke plate 19. A center pole piece 19a formed in the center portion of the bottom yoke plate 19 is inserted through the voice coil bobbin 14.

Figure 3:
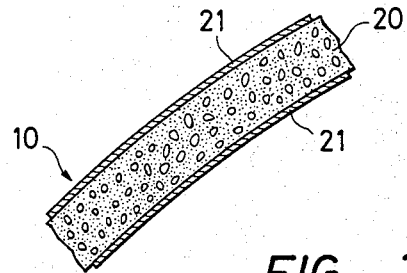
FIG. 3 is a larger scale fragmentary cross-sectional view of the part indicated by the one-dot chain line A in FIG. 2.

As shown in FIG. 3 showing the magnified view of the part indicated by the one-dot chain line A in FIG. 2, the diaphragm 10 is formed of a diaphragm base 20 and sealing member 21 coating both surfaces of the diaphragm base 20. The diaphragm base 20 is formed of ceramics material of a three-dimensional network structure. Alumina ($Al_2O_3$), silicon carbide (SiC) and silicon nitride ($Si_3N_4$) are adapted to ceramics materials. Those ceramic materials shown in the following table can be utilized.

|    | Oxide       | Carbide    | Nitride   | Boride  |
|----|-------------|------------|-----------|---------|
| Be | BeO         | BeC        |           |         |
| B  | BO          | $B_4C$, BC | BN, $B_3N_4$ |         |
| Si | SiO, $SiO_2$ | SiC        | $Si_3N_4$ |         |
| Ti | $TiO_2$     | TiC        | TiN       | $TiB_2$ |
| Al | $Al_2O_3$   |            | AlN       | $AlB_2$ |
| Mg | MgO         |            | $Mg_3N_2$ |         |
| Zr | $ZrO_2$     | ZrC        | ZrN       | $ZrB_2$ |
| W  |             | WC         |           |         |

Figure 4A:
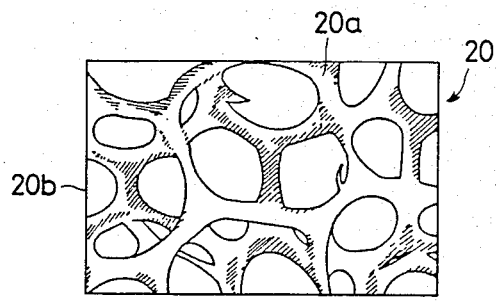
FIG. 4a is an even larger scale fragmentary cross-sectional view of the diaphragm base 20 shown in FIG. 3 when the deposit of the ceramic material is scarce.
Figure 4B:
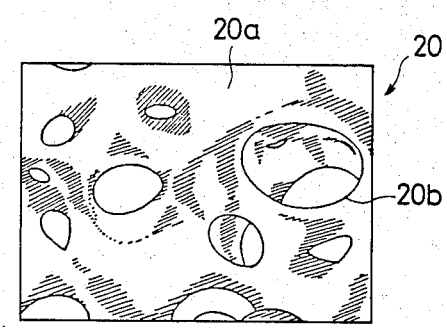
FIG. 4b is an even larger scale fragmentary cross-sectional view of the diaphragm base 20 shown in FIG. 3 when the deposit of the ceramic material is plentiful.

Magnified views of a part of the diaphragm base 20 are shown in FIGS. 4a and 4b. The diaphragm base 20 is formed of ceramics 20a of a three-dimensional structure and is air-permeable through void spaces 20b. FIG. 4a shows a case in which the void space rate is high (that is, the specific gravity is low). FIG. 4b shows a case in which the void space rate is low (that is, the specific gravity is high). If the diaphragm base 20 remains air-permeable, it will not be capable of acting as a loudspeaker diaphragm. Therefore, it is made air-tight with the above mentioned sealing member 21 by a method wherein the diaphragm base 20 is coated on at least one surface thereof with the sealing member 21 or by using a method wherein the diaphragm base 20 is impregnated in its interior with a void-blocking material such as that used for providing the sealing member 21.

Figure 5:
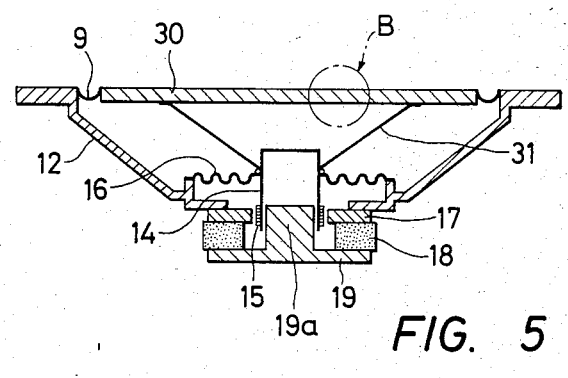
FIG. 5 is a sectioned view showing a loudspeaker device having a flat plate-shaped diaphragm to which the present invention is applied.

FIG. 5 shows a loudspeaker device having a flat plate-shaped diaphragm 30 of a three-dimensional network structure. The flat plate-shaped diaphragm 30 is supported by a drive cone 31 fixed to a voice coil bobbin 14. Further, the flat plate-shaped diaphragm 30 is supported at its peripheral edge portion by a frame 12 through an edge 9. The other parts are of the same formation as corresponding parts of the loudspeaker in FIG. 2, therefore bear reference numerals in common with those used in FIG. 2 and are not be described again here.

Figure 6:
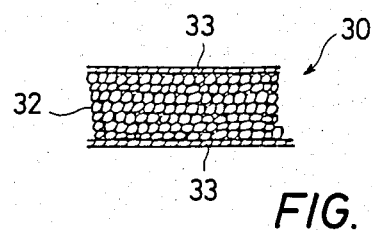
FIG. 6 is a fragmentary cross-sectional view of the part indicated by the one-dot chain line B in FIG. 5.

As shown in FIG. 6 showing a magnified view of the part indicated by the one-dot chain line B in FIG. 5, as same as the cone-shaped diaphragm 10 in FIG. 2, the flat plate-shaped diaphragm 30 is formed of a diaphragm base 32 made of ceramics of a three-dimensional network structure and sealing member 33 coating both surfaces of the diaphragm base 32.

A method of making a diaphragm made of ceramics of the above mentioned three-dimensional network structure shall be explained in the following.

FIG. 7 shows steps of making a loudspeaker diaphragm made of ceramics of a three-dimensional network structure using a mold of a combustible polyurethane foam. These steps shall be explained in the order. The reference numerals designating the steps in FIG. 7 correspond respectively to the reference numerals of the steps shown in the following explanation.

(1) First of all, a block-shaped non-rigid polyurethane foam is sliced to prepare a plate-shaped polyurethane foam.

(2) As such bubble films 35 as are shown in FIG. 8a are formed in the polyurethane foam, the bubble films 35 are removed by such known method as, for example, a so-called exploding method of impressing a high temperature and high pressure state for such time short enough that the greater part of the skeleton 36 will not be damaged but at least the bubble films 35 will be volatilized away by the high heat and only such skeleton 36 as is shown in FIG. 8b will be left.

(3) The plate-shaped polyurethane foam in which only the skeleton 36 is left is cut to be of a shape large enough to cover the size of the diaphragm.

(4) Further, by a hot press so as to form a diaphragm base mold, the cut plate-shaped polyurethane foam is molded to be of a rather properly larger diaphragm shape (funnel shape in the case of the cone-shaped diaphragm 10 in FIG. 2) in consideration of the contraction by the later-described baking. (This molding step is not necessary in the case of the flat plate-shaped diaphragm 30 in FIG. 5.)

(5) Ceramic material such as alumina, silicon carbide or silicon nitride is separately prepared.

(6) This ceramic material is prescribed, crushed mixed and made into a slurry (paste).

(7) The above-mentioned diaphragm base mold is impregnated with the ceramic slurry.

(8) The excess slurry is removed and a predetermined amount of the ceramic material is uniformly deposited on the skeleton of the diaphragm base mold.

(9) The diaphragm base mold with ceramic material is dried.

(10) After it is dried, the mold is then baked. When it is baked, a ceramic foam having a skeleton structure with the network of void spaces of the diaphragm base mold is thereby formed. In this process, the diaphragm base mold will be completely burned off.

(11) The baked ceramic foam for the diaphragm base, as baked, is air-permeable and it must therefore be sealed in order to be air-impermeable, as indeed it must be if it is going to be able to function as a loudspeaker diaphragm. Such various sealing methods as are shown in the following are considered:

(a) Pasting by plastics sheet

Al, Be, Ti, B, carbon-FRP (fiber-reinforced plastics) or aramid-FRP sheets are pasted on the least one surface of the diaphragm base.

(b) Painting with a latex coating

The diaphragm base is painted on the at least one surface with an acrylic ester latex coating, acrylonitrile butadiene rubber latex coating or styrene butadiene latex coating so as to be made air-impermeable. Such a latex coating has a proper internal loss (tan δ) and therefore acts also as a shock absorbing member.

(c) Painting with the same ceramic material.

By such means as of plasma jet coating, the same ceramic material is melt-jetted on at least one surface of the diaphragm base to air-seal the diaphragm base.

The sealing members 21 are formed on both surfaces of the diaphragm base 20 in the example in FIG. 3 but may be formed on only one surface. Also, the diaphragm base may be impregnated in the interior with the sealing member instead of being coated on the surface.

In the above mentioned embodiment, the case of using a non-rigid polyurethane foam for the diaphragm base mold is disclosed, but any other combustible foamed plastics can be used.

According to the above explained diaphragm and method of making the same of this invention, there are obtained such effects as the following:

(A) A diaphragm of a three-dimensional network structure is obtained easily. As the three-dimensional network structure has cubically overlapped skeletons, an apparent high bending stiffness is obtained and, as a result, the void space rate can be practically easily elevated (by 80 to 90%) and the apparent specific gravity $\rho$ can be made low same as that of paper with 0.3 to 0.6. Further, as the diaphragm is made of ceramic material, the Young's modulus E is high, and the apparent specific gravity $\rho$ can be made low, so that the sound velocity $\sqrt{E/\rho}$ can be made high.

(b) According to the making method of this invention, a diaphragm of a three-dimensional network structure made of ceramics can be easily made and, by adjusting the deposit amount of the ceramic material depending on the thickness of the skeletons of the burning-type foamed plastics constituting the diaphragm base mold and the density of bubbles, the thickness and density of the skeletons of the diaphragm base can be varied and the apparent specific gravity and the bending stiffness can be variously set.

(c) When the making method of this invention used, a diaphragm base made of ceramics of a less anisotropic and uniform three-dimensional network structure will be obtained, therefore a circular node line will be easily obtained and a node drive will be able to be easily made.

What is claimed is:

1. A method for making a diaphragm for an electroacoustic transducer, comprising:
   (a) providing a plate-shaped mold of combustible foamed plastics material having as a mold cavity a network of open interstices extending three-dimensionally therethrough and being exposed externally thereof;
   (b) filling said mold cavity with a slurry of ceramic material;
   (c) baking said ceramic material and burning-away said foamed plastics material, thereby providing a diaphragm base made of baked ceramic material having a network of open interstices extending three-dimensionally therethrough and being exposed externally thereof; and
   (d) applying a sealant to said diaphragm base so as to render said diaphragm base substantially air-impermeable thicknesswise thereof.

2. The method of claim 1, wherein:
said diaphragm base has a front surface and a back surface and the step of applying a sealant is carried out by adhering to at least one of said surfaces a sheet made of any one of Al, Be, Ti, B, carbon fiber-reinforced plastic material and aramid fiber-reinforced plastic material.

3. The method of claim 1, wherein:
said diaphragm base has a front surface and a back surface and the step of applying a sealant is carried out by painting at least one of said surfaces with a coating made of any one of acrylic ester latex material, acrylonitrile butadiene rubber latex material, and styrene butadiene latex material.

4. The method of claim 1, wherein:
said step of applying a sealant is carried out by impregnating said interstices of said diaphragm base with any one of acrylic ester latex material, acrylonitrile butadiene rubber latex material, and styrene butadiene latex material.

5. The method of claim 1, wherein:
said diaphragm base has a front surface and a rear surface and the step of applying a sealant is carried out by melt-jet-coating said diaphragm base on one of said surfaces with an air-impervious coating of ceramic material.

6. The method of claim 1, wherein:
said plate-shaped mold is of conically dished form.

7. The method of claim 1, wherein
said diaphragm has a substantially circular node line and is capable of being driven in node drive.

8. The method of claim 1, wherein:
said diaphragm has an apparent specific gravity of 0.3 to 0.6.

* * * * *